United States Patent

Schulz et al.

[11] Patent Number: 5,545,452
[45] Date of Patent: Aug. 13, 1996

[54] AQUEOUS PRECIOUS METAL PREPARATIONS AND THEIR USE FOR MANUFACTURING PRECIOUS METAL DECORATIONS

[75] Inventors: Andreas Schulz, Neu-Isenburg; Marco Höfler, Freigericht, both of Germany

[73] Assignee: Cerdec Aktiengesellschaft Keramische Farben, Frankfurt, Germany

[21] Appl. No.: 392,219

[22] Filed: Feb. 22, 1995

[30] Foreign Application Priority Data

Feb. 24, 1994 [DE] Germany ............... 44 05 932.9

[51] Int. Cl.$^6$ ............... A61F 13/02; E04F 15/16
[52] U.S. Cl. ............... 428/41.7; 156/237; 427/147; 428/914; 428/41.8; 428/42.1; 524/780; 524/785
[58] Field of Search ............... 427/229, 256, 427/385.5, 147; 156/237; 428/40, 914; 524/780, 785

[56] References Cited

U.S. PATENT DOCUMENTS

5,401,535  3/1995  Bishop ............... 427/229

FOREIGN PATENT DOCUMENTS

| | | |
|---|---|---|
| 0491143 | 6/1992 | European Pat. Off. . |
| 0514073 | 11/1992 | European Pat. Off. . |
| 3217049 | 11/1982 | Germany . |
| 3807290 | 9/1989 | Germany . |
| 2216536 | 10/1989 | United Kingdom . |

OTHER PUBLICATIONS

Elvers, Ullmann's Encyclopedia of Industrial Chemistry, 5th Edition, vol. A 24 pp. 81–85 (1993).

*Primary Examiner*—Michael Lusignan
*Attorney, Agent, or Firm*—Wenderoth, Lind & Ponack

[57] ABSTRACT

The invention relates to aqueous precious metal preparations and their use for manufacturing precious metal decorations.

Precious metal preparations are known for the manufacture of precious metal decorations on the basis of one or more precious metals from the series gold, silver, platinum and palladium, which have an organic or organic/aqueous solvent system. There is a need for preparations which are essentially free from organic solvents.

Preparations according to the invention contain a precious metal thiolate which has at least one functional group capable of salt formation, in the form of a water soluble salt, a water-soluble polymer organic binder, a surfactant in effective quantity and, as solvents, water and less than 2% by weight of organic solvents. Preferred preparations contain a gold thiolate of the formula Au—S—Q—COOH, Q standing for a divalent organic group optionally containing functional groups, polyvinylpyrrolidone and/or hydroxyethylcellulose as binders and as surfactant an alkylbenzene sulphonate or a polyether-polysiloxane copolymer in a quantity of 0.1 to 2.0% by weight.

High-gloss, speck-free decorations can be produced by using the preparations which are essentially free from organic solvents.

18 Claims, No Drawings

AQUEOUS PRECIOUS METAL PREPARATIONS AND THEIR USE FOR MANUFACTURING PRECIOUS METAL DECORATIONS

DESCRIPTION

The invention relates to aqueous precious metal preparations on the basis of one or more precious metals from the series Au, Ag, Pt and Pd, the preparations containing at least one water-soluble precious metal thiolate, an organic binder and water and being essentially free from organic solvents. The preparations are used to make precious metal decorations.

Precious metal preparations, including so-called bright gold preparations and burnishing gold preparations, have long been used to make a precious metal decoration, which also includes conductor tracks of integrated circuits, on a stovable substrate, such as glass, porcelain and ceramic in particular. Generally speaking such preparations contain one or more organic sulphur precious metal compounds, one or more organic polymer binders and a solvent system. To set desirable optical and advantageous usage properties of the decoration to be manufactured the preparations also contain other soluble and/or insoluble precious metal compounds and/or gold powder and one or more flow agents, such as oxides, resinates, salts or coordination compounds of B, Si, V, Cr, In, Zn, Sb, Bi and Rh, and also further auxiliary substances to set the processing properties of such preparations. The precious metal preparations are applied to the surface to be coated by means of common direct and indirect printing processes, spraying or painting or by using the decalcomania process. After the solvent has evaporated there is a storing process at a temperature adapted to the substrate and the gold preparation—the maximum stoving temperature is usually between 400° and 900° C., although higher temperatures are also possible in special cases. A precious metal film is formed and fixed on the surface of the substrate by means of the stoving process.

For a long time the organic sulphur gold compounds for the said decoration preparations have been almost exclusively so-called gold sulphoresinates which were obtained from a gold(III) salt and a sulphurated, particularly naturally occurring terpene. The gold is in the monovalent form in these and in synthetic gold thiolates of the general formula Au—S—R, where R stands for an alkyl, cycloalkyl, aryl or aralkyl group or a bicyclic hydrocarbon group. When used in gold preparations the above-mentioned gold compounds require the use of a purely organic solvent system—reference is made to EP-B 0 491 143 by way of example.

For reasons of industrial hygiene, safety and the environment, persons skilled in the art have endeavoured to find precious metal preparations in whose solvent system at least a part of the organic solvent is replaced by water. DE-OS 32 17 049 discloses a coating agent for applying an overglaze decoration to porcelain which contains 15 to 40% by weight of polyvinylpyrrolidone or a mixture of polyvinylpyrrolidone and aqueous polyethylene oxide, 45 to 85% by weight of ethylene glycol and/or propylene glycol and possibly water. Oxides, gold and organic gold compounds are named as the substances imparting colour in this document. An example of a gilding preparation (burnishing gold) contains gold powder and a coating agent which contains 72% by weight of glycols, 6.3% by weight of water and 1.5% by weight of a non-ionic surfactant apart from the said polymers. The document makes no disclosure about the structure of the gold compounds and about the composition of purely aqueous gilding preparations.

DE 38 07 290 C2 discloses burnishing gold preparations similar to those described above (DE 32 17 049): apart from gold powder and/or sparingly soluble gold compounds, polyvinylpyrrolidone, water, water-soluble alcohols and surfactants, these preparations contain an aqueous acrylic resin dispersion.

Homogeneous compositions, preferably solutions, which form a glossy metallic precious metal film on stoving are known from EP-A 0 514 073. The compositions contain 3 to 22% by weight of a precious metal thiolate, a polymer resin and, as the solvent system, a mixture of water and an organic solvent (co-solvent) which preferably means water-miscible alcohols, ethers or esters. Both the precious metal thiolate and the binder should be soluble in the water/co-solvent mixture. The compositions contain 5 to 85% by weight, preferably 40 to 55% by weight, of water and 5 to 45% by weight, preferably 15 to 30% by weight, of co-solvent. The gold(I) thiolates that are preferably used are those of the general formula Au—S—R—H or Au—S—R—X, where X stands for a nitro-group or —COOH, —$SO_2$OH, —OH, —$CONH_2$, —$NH_2$ or —O—P(O) (OH)$_2$, it being possible for the H atoms to be substituted if required, or salts thereof and R for a divalent organic group. From numerous examples and comparative examples it is clear from the said document that only quite specific gold(I) thiolates in corresponding gold preparations containing water and co-solvent lead to decorations with a good gloss and good adhesion to the decorated base. Although the document discloses that it can be appropriate to include a surfactant to improve brushability, none of the exemplary preparations contains a surfactant. No indications as to the conditions under which the co-use of an organic co-solvent can be dispensed with can be obtained from EP-A 0 514 073.

A burnishing gold preparation which contains polyvinylpyrrolidone and water and which also contains an aqueous acrylate resin dispersion as the binder and gold powder and/or a sparingly soluble gold compound as the colouring component is known from GB-A 22 16 536. According to the examples alcoholic solvents are always present in these preparations also. In addition the exemplary preparations contain 5 and/or 6% by weight of a non-ionogenic wetting agent. No stimulus to use a water-soluble gold compound and dispense with the presence of glycols and alcohols can be obtained from this document.

The object of the invention is to propose aqueous precious metal preparations, in particular bright gold preparations, which contain a thiolate as the precious metal compound and are essentially free from organic solvents. It should be possible to manufacture aesthetically high-quality, well adhering decorations on stovable substrates by using the aqueous precious metal preparations. High-gloss, pore- and speck-free decorations are meant in particular by aesthetically high-quality decorations.

The object is achieved by a precious metal preparation for manufacturing precious metal decorations on the basis of one or more precious metals from the series gold, silver, platinum and palladium, containing a precious metal thiolate which has at least one functional group capable of salt formation, in the form of a water-soluble salt, a water-soluble polymer organic binder, an aqueous solvent system and a surfactant in effective quantity, which is characterized in that the solvent system comprises water and less than 2% by weight, related to the preparation, of organic solvents.

Preferred preparations contain a gold(I) and/or silver thiolate in water-soluble form. Pt(II) and/or Pd(II) thiolates can also be added in order to influence the colour.

As was surprisingly found, the solvent system can essentially be purely aqueous in the boundary conditions according to the invention in respect of thiolates and polymers as well as surfactants. By "essentially" is meant that the proportion of organic solvents is less than 2% by weight, preferably 0 or less than 1% by weight, related to the preparation. The said residual content of organic solvents can result from the use of the auxiliary substances used, if these are commercially available in the form of organic solutions and are used in that form.

The precious metal thiolates that can be used in preparations according to the invention have structural elements, viz. at least one acidic or basic group capable of salt formation, which afford them adequate solubility in water. Generally speaking the preparations contain 2 to 25% by weight, preferably 5 to 15% by weight, of precious metal in the form of one or more thiolates. The solubility in water of the thiolate must accordingly be higher with a high precious metal content of the preparation than with a lower content.

In the manufacture of the preparations a water-soluble salt of a thiolate is used directly or the salt is formed in situ, from a precious metal thiolate having at least one acidic functional group and a base, such as an alkali lye, ammonia or an amine or from a precious metal thiolate having one amino group and an acid, such as lower carbonic acid. Particularly preferably the preparations contain a salt of a precious metal thiolate having one or more carboxyl groups and a primary, secondary or tertiary amine or an N-heterocyclic base. Preferably the thiolates begin to decompose at a temperature above 200° C.

Gilding preparations can contain salts of gold(I) thiolates, as were disclosed in EP-A 0 514 073 and proved particularly effective. Particularly preferably the preparations contain salts of gold(I) thiolates of the general formula Au—S—Q—COOH, where Q stands for a divalent organic group optionally having further functional groups. The organic group can essentially be aliphatic, cycloaliphatic, aromatic or heteroaromatic. Appropriately the Q group has a limited number of C atoms, preferably between 2 and 10 C atoms. The gold thiolates which can be preferably used in preparations according to EP-A 0 514 073, such as gold thiolates of N-(mercaptoalkanoyl)amino acids and of N-acylcysteines in particular, can also be satisfactorily used in the preparations according to the invention in the form of their salts. In individual cases the person skilled in the art will investigate by means of guide experiments whether a selected precious metal thiolate also guarantees the desired decoration properties apart from solubility in water.

Preparations according to the invention contain polymer binders that are soluble in water, which also means a clear dispersion. Suitable binders are polyacrylic acid, polymethacrylic acid, polyvinylpyrrolidone, cellulose ethers, particularly carboxyalkyl and hydroxyalkyl cellulose, polyalkylene glycol, polyvinyl acetate, polyvinyl alcohol, polyamines and polyurethane resins and alkyd resins that can be diluted with water. The binders can be used in the form of homopolymers or copolymers or block polymers, either alone or in the form of mixtures. Polyvinylpyrrolidone homo- or copolymers as well as hydroxyethyl cellulose and mixtures thereof are particularly preferred.

The proportion of polymer binders in the preparations usually lies in the range between 3 and 45% by weight, preferably between 3 and 20% by weight and in particular 4 to 10% by weight. The weight ratio of binder to precious metal in the preparations appropriately lies in the range between 0.1 and 2, preferably between 0.3 and 1.2 and particularly between 0.5 and 1.0.

A constituent of the aqueous preparations that is essential to the invention is a surfactant which is compatible with the salt of the thiolate and coming from the series of anionic, non-ionic, amphoteric and cationic surfactants in an effective quantity. The person skilled in the art will verify the compatibility and efficacy of a selected surfactant by means of guide experiments because interactions with the other constituents of the preparation can also occur. A good effect is usually achieved with a quantity of surfactant between 0.1 and 2% by weight, related to the preparation; a larger or smaller quantity is, however, possible in individual cases. The surfactant content is preferably between 0.2 and 1% by weight.

In the molecule the surfactants contain a hydrophobic group of 8 to 26 and particularly 10 to 18 C atoms or another hydrophobic grouping, such as, for example, one based on polydimethyl siloxane, and at least one anionic, amphoteric, non-ionic or cationic group which imparts solubility in water.

Suitable examples of the anionic surfactants are: straight-chain or branched-chain alkylbenzene sulphonates, particularly those with a straight-chain $C_8$ to $C_{16}$ alkyl group, aliphatic and olefinic ($C_8$–$C_{18}$) sulphonates, hydroxyalkane sulphonates, fatty acid esters of oxyethane sulphonic acid, fatty alcohol sulphates, sulphated fatty acid alkylolamides and fatty acid monoglycerides as well as sulphated alkoxylation products of fatty alcohols, alkyl phenols, fatty acid amides; saturated and unsaturated fatty acid salts, alkyl and alkenyl ether carbonic acid salts containing a ($C_{10}$–$C_{20}$) alkyl or alkenyl group and a polyethylene glycol group comprising 1 to 8 units; α-sulpho fatty acids; amide-like condensation products of fatty acids or sulphonic acids with aminocarbonic acids, such as glycine, sarcosin, albumen hydrolysates. Particularly suitable anionic surfactants are alkylbenzene sulphonates with 8 to 14 C atoms, particularly in the form of a salt with an amine in a quantity of 0.1 to 2% by weight, preferably 0.2 to 1% by weight, related to the preparation.

Non-ionic surfactants owe their solubility in water to the presence of polyether groups, also aminoxide, sulphoxide, phosphine oxide and alkylolamide groupings. Of particular interest are alkoxylation products, particularly ethyoxylation products of fatty alcohols, alkyl phenols, fatty amines, alkanol amines, fatty acids, fatty acid and sulphonic acid amides. Water-soluble, polyether-modified polysiloxanes—these are polyether-polysiloxane copolymers, it being possible for linear or branched block copolymer structures to be present—are a further group of non-ionic surfactants that is particularly effective in the preparations according to the invention. With this category the quantity used is preferably between 0.1 and 2.0% by weight, particularly between 0.2 and 1.0% by weight, related to the preparation. The polyether segments are polyoxyethylene, polyoxypropylene or poly(oxyethylene-oxypropylene) segments, polyoxyethylene segments and particularly those with 4 to 20 oxyethylene units being preferred. The polysiloxane segments are preferably based on dimethyl siloxane. The polyether and polysiloxane segments can be bound together via Si—O—C or Si—C bonds. By way of example reference is made to Ullmann's Encyclopedia of Industrial Chemistry, 5th ed., vol. A 24, pp. 83–84 (1993) and Ind. Eng. Chem. Proc. Res., Dev. 6 (1967), pp. 88–92.

Amphoteric surfactants contain both an acidic group such as a carboxyl, sulphonic acid, sulphuric acid semi-ester or phosphoric acid partial ester group as well as a basic, such as a primary, secondary, tertiary, quaternary ammonium group, hydrophilic group. Betaines are included here, such as those of the type

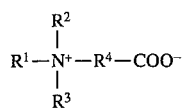

where $R^1$ is alkyl, alkenyl, hydroxyalkyl with 8 to 24 C atoms, $R^2$ and $R^3$ are identical or different, alkyl or hydroxyalkyl with 1 to 4 C atoms, $R^4$ is alkylene or hydroxyalkylene with 1 to 6 C atoms.

The cationic surfactants are mostly substances of the formula:

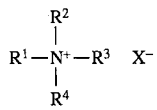

where $R^1$ is alkyl or alkenyl with 8 to 24 C atoms, $R^2$ to $R^4$ are alkyl or hydroxyalkyl with 1 to 5 C atoms and $X^-$ a halogen atom.

In the case of gilding preparations, particularly bright gold preparations and burnishing gold preparations, to influence colour these contain a small quantity of one or more other precious metal compounds which are essentially soluble in the system in the form of resinates or sulphoresinates or in the form of simple precious metal salts or complexes. The preparations also usually contain flow agents in the form of compounds, such as resinates, salts, oxides or coordination compounds, of one or more of the elements boron, silicon, vanadium, chromium, indium, tin, antimony, bismuth and rhodium.

Further auxiliary substances in the preparations according to the invention can be common substances for changing the rheological properties of the preparation, the adhesion of concentrating auxiliary substances as well as drying accelerators if a UV-hardenable resin is used. The additional use of an aqueous polysulphide solution has proved appropriate in many cases, particularly in preparations containing polyvinylpyrrolidone.

In the case of so-called bright gold preparations these preferably contain a gold(I) thiolate in the form of a salt in a quantity of 2 to 25% by weight, preferably 5 to 15% by weight, calculated as gold in each case. The proportion of binder in the preparations is generally between 3 and 45% by weight, preferably between 3 and 10% by weight, the weight ratio of resin to precious metal preferably being between 0.3 and 1.2. The water content is generally between 10 and 90% by weight, preferably between 40 and 80% by weight, related to the preparation in each case. The amount of flow agents used usually varies in the range between 0.01 and 2% by weight, related to the preparation. In the case of so-called burnishing gold preparations these additionally contain gold powder and/or finely divided, insoluble gold compounds. Depending on the desired effect, burnishing gold preparations can also contain glass frits and/or organosilicon compounds.

The manufacture of the aqueous preparations is simple: the precious metal thiolates are dissolved in water at room temperature or a higher temperature, preferably at 30° to 80° C., with the addition of a base, preferably an amine. Generally speaking the quantity of base required to neutralize the acid groups is used per mol of thiolate; in some cases complete dissolution is even achieved with a shortfall of base. An excess of base is possible but is not generally required. The flow agents are added to the solution obtained and dissolved. The binder is then introduced into the solution direct and dissolved in it. Alternatively the binder or binder mixture can be dissolved in water, with the addition of further auxiliary substances such as a polysulphide solution if required, and this solution combined with the solution containing precious metal. The surfactant is added to one of the solutions in the course of making the preparation or to the preparation itself when manufacture is completed.

The preparations according to the invention can be directly applied to the surface to be decorated by means of common decoration processes such as spraying, brushing or known printing processes, particularly screen printing processes and stoved at a temperature generally between 400° and 900° C. after the water has evaporated and the decoration forms.

Alternatively the precious metal preparation according to the invention can be applied to the object to be decorated with the co-use of a decalcomania transfer. The decalcomania transfer is made in a way with which the person skilled in the art will be familiar, the precious metal thiolate compound being located in the decoration layer of the decalcomania transfer. A decoration layer is applied to a separation layer which is soluble in water and applied to a carrier, or a thermo-separation layer, using a preparation containing precious metal and described above and allowing the water to evaporate and crosslinking the binder if required; the decoration layer is usually film-coated.

The invention has provided essentially purely aqueous preparations which are eminently suitable for making film-like decorations containing precious metals. The decorations are surprisingly high-gloss and adhere to the substrate surface in an excellent manner as a coherent film is formed. The production of speck- and pore-free films which meet the aesthetic requirements is also successfully achieved.

With respect to the prior art it could not be foreseen that it is possible to make available precious metal preparations for manufacturing precious metal decorations, particularly bright gold decorations, in which the use of organic solvents can be dispensed with. In the past the view evidently was that the presence of a fairly large quantity of organic solvents was absolutely necessary in preparations containing water. As the examples which follow show, by means of the combination according to the invention of specific thiolates, water-soluble polymers and a surfactant it is possible to obtain purely aqueous preparations and with their assistance produce high-quality decorations on stovable substrates.

Examples 1 to 5

Manufacture of the preparations

To manufacture the preparations the gold and silver thiolate were dissolved in water at 50° C. with the addition of the amine; the auxiliary substances were then introduced; then the polyvinylpyrrolidone was introduced dropwise in the form of an aqueous solution and a homogeneous solution produced by agitation; where necessary, the desired water content is adjusted by dilution with water.

TABLE 1

| Composition of bright gold preparations (parts by weight): | | | | | |
|---|---|---|---|---|---|
| Example No. | 1 | 2 | 3 | 4 | 5 |
| Gold(I)-N-acetylcysteine | 17.9 | 17.9 | 17.9 | — | — |
| Gold(I)-N-(2-mercaptopropionyl)glycine | — | — | — | 17.9 | 17.9 |

TABLE 1-continued

Composition of bright gold preparations (parts by weight):

| Example No. | 1 | 2 | 3 | 4 | 5 |
|---|---|---|---|---|---|
| Silver-N-(2-mercapto-propionyl)glycine | 2.6 | 2.6 | 2.6 | 2.6 | 2.6 |
| Polyvinylpyrrolidone | 5.3 | 5.3 | 5.3 | 5.3 | 5.3 |
| Polyether-polysiloxane copolymer as 46% solution in dipropyleneglycol monomethylether, (ByK ® 346, ByK Chemie GmbH) | — | 1.0 | — | 1.0 | — |
| Isopropylamine-dodecylbenzene sulphonate | — | — | 1.0 | — | 1.0 |
| Water | 67.1 | 67.1 | 67.1 | 67.1 | 67.1 |
| Rhodium chloride | 0.15 | 0.15 | 0.15 | 0.15 | 0.15 |
| Chromium sulphate | 0.04 | 0.04 | 0.04 | 0.04 | 0.04 |
| Ammonium bismuth citrate | 0.61 | 0.61 | 0.61 | 0.61 | 0.61 |
| Triethylamine | 5.3 | 5.3 | 5.3 | 5.3 | 5.3 |

Decoration process

The preparations were applied to porcelain with a brush. (a) storing conditions: heating to 880° C. took place within 30 minutes and the stated temperature was maintained for 2 minutes; (b) heating to 820° C. in 1 hour and 10 minutes' retention time.

Only a mottled, partially porous decoration was obtained with the preparation according to Example 1 which was not according to the invention. High-gloss, speck-free and satisfactorily adhering decorations were obtained with the preparations according to the invention according to Examples 2 to 5 under the storing conditions (a) as well as (b).

Examples 6 and 7

Aqueous bright gold preparation on the basis of gold(I)-N-acetylcysteine and silver-N-(2-mercaptopropionyl)glycine as precious metal thiolates and hydroxyethylcellulose (=Natrasol from Aqualon Ltd., UK) as binder with (=Example 6—according to the invention) and without (=Example 7—not according to the invention) polyether-modified polydimethylsiloxane (=ByK®346) as surfactant. Rh, Cr and Bi auxiliary substances as in Examples 1 to 5. Manufacture of the preparation similar to the general specification.

TABLE 2

Bright gold preparations

| Example No. | 6 | 7 |
|---|---|---|
| | (contents in % by weight, related to the preparation) | |
| Au content | 9.71 | 9.62 |
| Ag content | 1.1 | 1.08 |
| Rh content | 0.07 | 0.07 |
| $Cr_2O_3$ content | 0.01 | 0.01 |
| $Bi_2O_3$ content | 0.30 | 0.30 |
| Binder | 5.3 | 5.3 |
| Surfactant ByK ® 346 (46% in dipropyleneglycolmono-methylether) | 1 | — |
| Triethylamine (for salt formation of the thiolates) | 5.3 | 5.3 |

When porcelain was decorated by means of screen printing under the stoving conditions (a) and (b), the preparation according to Example 6 produced high-gloss, speck-free decorations. The preparation according to Example 7 which is not according to the invention produced only mottled decorations.

Examples 8 and 9

Aqueous bright gold preparations based on the Au thiolate and surfactant (ByK®346) stated in Examples 6 and 7 as well as the auxiliary substances according to Examples 1 to 5.

Mixtures of polyvinylpyrrolidone (PVP K25, Fluka) and hydroxyethylcellulose (Natrasol®, Aqualon Ltd.) in the ratio 1 to 2 were used as binders; an aqueous ammonium polysulphide solution (15% by weight) was also used.

TABLE 3

Bright gold preparations

| Example No. | 8 | 9 |
|---|---|---|
| | (contents in % by weight, related to the preparation) | |
| Au content | 9.48 | 9.48 |
| Rh content | 0.06 | 0.06 |
| $Cr_2O_3$ content | 0.02 | 0.02 |
| $Bi_2O_3$ content | 0.22 | 0.22 |
| PVP K25 | 3.5 | 1.75 |
| Natrasol ® | 1.75 | 3.5 |
| ByK ® 346 (unchanged) | 1.0 | 1.0 |
| Triethylamine (for salt formation) | 4.9 | 4.9 |
| $(NH_4)_2 Sx$ | 0.18 | 0.18 |

When applied by brush the preparation according to Example 8 stored to produce a silky gloss. After application by screen printing at 820° C. the preparation according to Example 9 stored to produce a high gloss.

Examples 10 and 11

Examples 6 and 7 were repeated, but with Au(I)-N-(2-mercaptopropionyl) glycine being used instead of Au(I)-N-acetylcysteine.

TABLE 4

Bright gold preparations

| Example No. | 10 | 11 |
|---|---|---|
| | (contents in % by weight, related to the preparation) | |
| Au content | 9.62 | 9.7 |
| Ag content | 1.09 | 1.1 |
| Rh content | 0.07 | 0.07 |
| $Cr_2O_3$ content | 0.01 | 0.01 |
| $Bi_2O_3$ content | 0.30 | 0.30 |
| Binder (Natrasol ®) | 5.3 | 5.3 |
| ByK ® 346 (unchanged) | 1 | — |
| Triethylamine | 5.3 | 5.3 |

After application by screen printing the preparation according to Example 11 (not according to the invention) produced only mottled decorations, under both storing conditions (a) and (b).

After application to porcelain by screen printing the preparation according to Example 10 produced high-gloss, speck- and pore-free decorations.

We claim:

1. A precious metal preparation for manufacturing precious metal decorations which comprises
   a decorative effective amount of at least one precious metal thiolate wherein the precious metal is selected from the group consisting of gold, silver, platinum and palladium, said thiolate having at least one functional group capable of salt formation and being in the form of a water-soluble salt,
   an effective amount of a water-soluble organic polymer binder,
   an effective amount of an aqueous solvent system which comprises water and less than 2% by weight, based on the preparation, of organic solvents, and
   an effective amount of a surfactant.

2. A precious metal preparation according to claim 1, containing a salt of a precious metal thiolate having one or more carboxyl groups and a primary, secondary or tertiary amine or an N-heterocyclic base.

3. A precious metal preparation according to claim 1 or 2, containing a water-soluble salt of a gold(I) thiolate of the general formula Au—S—Q—COOH, wherein Q represents a divalent organic group optionally containing further functional groups.

4. A precious metal preparation according to claim 3 wherein the gold(I) thiolate begins to decompose at a temperature above 200° C.

5. A precious metal preparation according to claim 3, containing a water-soluble salt of a gold(I) thiolate selected from the group consisting of gold(I)-N-mercapto-$C_2$— or $C_3$—(alkanoyl)amino acids or gold(I)-N-acylcysteines.

6. A precious metal preparation according to claim 1 or 2, wherein the organic polymer binder is selected from the group consisting of polyvinypyrrolidone homo- or copolymers, polyacrylic acid homo- or copolymers, polymethacrylic acid homo- or copolymers, water-soluble cellulose ethers and mixtures of the said binders.

7. A precious metal preparation according to claim 3, wherein the organic polymer binder is selected from the group consisting of polyvinylpyrrolidone homo- or copolymers, polyacrylic acid homo- or copolymers, polymethacrylic acid homo- or copolymers, water-soluble cellulose ethers and mixtures of the said binders.

8. A precious metal preparation according to claim 1 or 2 containing, as surfactant, 0.1 to 2.0% by weight of a polyoxyethylene polydimethylsiloxane.

9. A precious metal preparation according to claim 8 wherein the amount of surfactant is 0.2 to 1.0% by weight.

10. A precious metal preparation according to claim 3 containing, as surfactant, 0.1 to 2.0% by weight of a polyoxyethylene polydimethylsiloxane.

11. A precious metal preparation according to claim 1 or 2 containing, as surfactant, an alkylbenzene sulphonate with 8 to 14 C atoms in the alkyl group in the form of a salt with an amine in a quantity of 0.1 to 2% by weight.

12. A precious metal preparation according to claim 11 wherein the amount of surfactant is 0.2 to 1.0% by weight.

13. A precious metal preparation according to claim 1 or 2, wherein the thiolate is present in the form of a salt with tri($C_1$ to $C_3$)alkylamine or mono-, di- or triethanolamine and the preparation also contains common auxiliary substances for setting the optical and usage properties of the decoration to be manufactured and/or the processing properties of the preparation.

14. A precious metal preparation according to claim 3, wherein the thiolate is present in the form of a salt with tri($C_1$ to $C_3$)alkylamine or mono-, di- or triethanolamine and the preparation also contains common auxiliary substances for setting the optical and usage properties of the decoration to be manufactured and/or the processing properties of the preparation.

15. A decalcomania transfer, obtained by applying a decoration layer to a carrier provided with a separation layer, allowing solvents to evaporate and film-coating the dried decoration layer, wherein the decoration layer is produced using a precious metal preparation according to claim 1 or 2.

16. A decalcomania transfer, obtained by applying a decoration layer to a carrier provided with a separation layer, allowing solvents to evaporate and film-coating the dried decoration layer, wherein the decoration layer is produced using a precious metal preparation according to claim 3.

17. A process for decorating a stovable substrate which comprises applying a preparation containing a precious metal thiolate or a decalcomania transfer containing this preparation in the dry state to the substrate and stoving at 400° to 900° C. wherein the previous metal thiolate preparation employed is as defined in claim 1 or 2.

18. A process for decorating a stovable substrate which comprises applying a preparation containing a precious metal thiolate or a decalcomania transfer containing this preparation in the dry state to the substrate and stoving at 400° to 900° C., wherein the previous metal thiolate preparation employed is as defined in claim 3.

* * * * *